: United States Patent (10) Patent No.: US 12,206,279 B2
Irish et al. (45) Date of Patent: Jan. 21, 2025

(54) POWER BALANCING SOLAR CHARGING SYSTEM

(71) Applicant: Optivolt Labs, Inc., Burlingame, CA (US)

(72) Inventors: Linda Irish, Burlingame, CA (US); Daniel Kofman, Burlingame, CA (US); Sriram Raghu, Burlingame, CA (US); Amira Ryce, Burlingame, CA (US)

(73) Assignee: Optivolt Labs, Inc., San Francisco, CA (US)

(*) Notice: Subject to any disclaimer, the term of this patent is extended or adjusted under 35 U.S.C. 154(b) by 579 days.

(21) Appl. No.: 17/376,081

(22) Filed: Jul. 14, 2021

(65) Prior Publication Data
US 2022/0021850 A1 Jan. 20, 2022

Related U.S. Application Data

(60) Provisional application No. 63/052,349, filed on Jul. 15, 2020.

(51) Int. Cl.
H02J 7/35 (2006.01)
G05F 1/67 (2006.01)
(Continued)

(52) U.S. Cl.
CPC ............... H02J 7/35 (2013.01); G05F 1/67 (2013.01); H02J 3/381 (2013.01); H02J 7/345 (2013.01);
(Continued)

(58) Field of Classification Search
CPC .... H02J 7/345; H02J 7/35; H02J 3/381; H02J 2300/24; G05F 1/67; H02S 40/30;
(Continued)

(56) References Cited

U.S. PATENT DOCUMENTS 5,530,335 A * 6/1996 Decker ............... H01M 10/465
320/149
2001/0023703 A1 9/2001 Kondo et al.
(Continued)

FOREIGN PATENT DOCUMENTS

WO 2020081215 A1 4/2020

OTHER PUBLICATIONS

International Search Report and Written Opinion for International Patent Application No. PCT/US2021/041699 mailed on Oct. 20, 2021, 17 pages.
(Continued)

Primary Examiner — Richard Isla
Assistant Examiner — Manuel Hernandez
(74) Attorney, Agent, or Firm — Run8 Patent Group, LLC; Peter Miller; Alexander Rodriguez

(57) ABSTRACT

A system for charging a device can include a housing and a first solar panel, a second solar panel connected in series to the first solar panel, and a third solar panel connected in series to the first solar panel and the second solar panel. The system can include a boost converter including an input channel connected to the first, second, and third solar panels and an output channel configured to couple to the device. The system can include a charge pump including a first flying capacitor connected between the first solar panel and the third solar panel and a second flying capacitor connected between the second solar panel and the third solar panel. The system can include a controller configured to selectively switch connectivity between the set of solar panels and the set of flying capacitors to route current to the boost converter.

14 Claims, 4 Drawing Sheets

(51) Int. Cl.
  *H02J 3/38* (2006.01)
  *H02J 7/34* (2006.01)
  *H02S 40/30* (2014.01)
  *H02S 40/38* (2014.01)
  *H02S 50/00* (2014.01)

(52) U.S. Cl.
  CPC .............. *H02S 40/30* (2014.12); *H02S 40/38* (2014.12); *H02S 50/00* (2013.01); *H02J 2300/24* (2020.01); *Y02E 10/50* (2013.01); *Y02E 10/56* (2013.01)

(58) Field of Classification Search
  CPC ......... H02S 40/38; H02S 50/00; Y02E 10/50; Y02E 10/56
  USPC ......................................................... 320/101
  See application file for complete search history.

(56) References Cited

U.S. PATENT DOCUMENTS

| | | | | |
|---|---|---|---|---|
| 2003/0174524 | A1* | 9/2003 | Botker | H02M 3/07 363/60 |
| 2005/0161079 | A1* | 7/2005 | Gray | H04B 1/3883 136/251 |
| 2008/0303503 | A1* | 12/2008 | Wolfs | G05F 5/00 323/301 |
| 2010/0013309 | A1* | 1/2010 | Rosenblatt | H02J 7/35 307/64 |
| 2010/0289338 | A1* | 11/2010 | Stauth | H01L 31/02021 307/77 |
| 2010/0308660 | A1* | 12/2010 | Willis | H02J 1/102 307/77 |
| 2011/0199707 | A1 | 8/2011 | Kazemi et al. | |
| 2012/0170770 | A1* | 7/2012 | Lesso | H02M 3/07 327/536 |
| 2013/0320911 | A1 | 12/2013 | Kamiya et al. | |
| 2014/0001856 | A1* | 1/2014 | Agamy | H02M 3/155 307/43 |
| 2014/0111015 | A1* | 4/2014 | Fall | H01L 31/02021 323/299 |
| 2015/0214887 | A1* | 7/2015 | Ben-Yaakov | H02M 3/01 307/52 |
| 2017/0179715 | A1* | 6/2017 | Huang | H02M 3/155 |
| 2017/0366018 | A1 | 12/2017 | Novak et al. | |
| 2018/0069490 | A1 | 3/2018 | Fu | |
| 2018/0233614 | A1 | 8/2018 | Dai et al. | |
| 2018/0255216 | A1* | 9/2018 | Siminoff | H04N 23/50 |
| 2018/0374965 | A1 | 12/2018 | Ledenev et al. | |
| 2020/0081215 | A1 | 3/2020 | Maricevic et al. | |

OTHER PUBLICATIONS

Notification of the International Application Number and of the International Filing Date for International Patent Application No. PCT/US2021/041699 mailed on Jul. 30, 2021, 1 page.

International Search Report and Written Opinion for International Patent Application No. PCT/US2021/051985 mailed on Dec. 13, 2021, 11 pages.

Office action received in U.S. Appl. No. 17/542,222 dated Mar. 22, 2022.

* cited by examiner

POWER BALANCING SOLAR CHARGING SYSTEM

CROSS-REFERENCE TO RELATED APPLICATIONS

This Application claims the benefit of U.S. Provisional Application No. 63/052,349 filed on 15 Jul. 2020 and entitled "Smart Doorbell Solar Charging System," which is incorporated in its entirety by this reference.

TECHNICAL FIELD

This invention relates generally to the field of solar power systems and more specifically to a new and useful power balancing solar charging system in the field of solar power systems.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Systems

Figure 1:
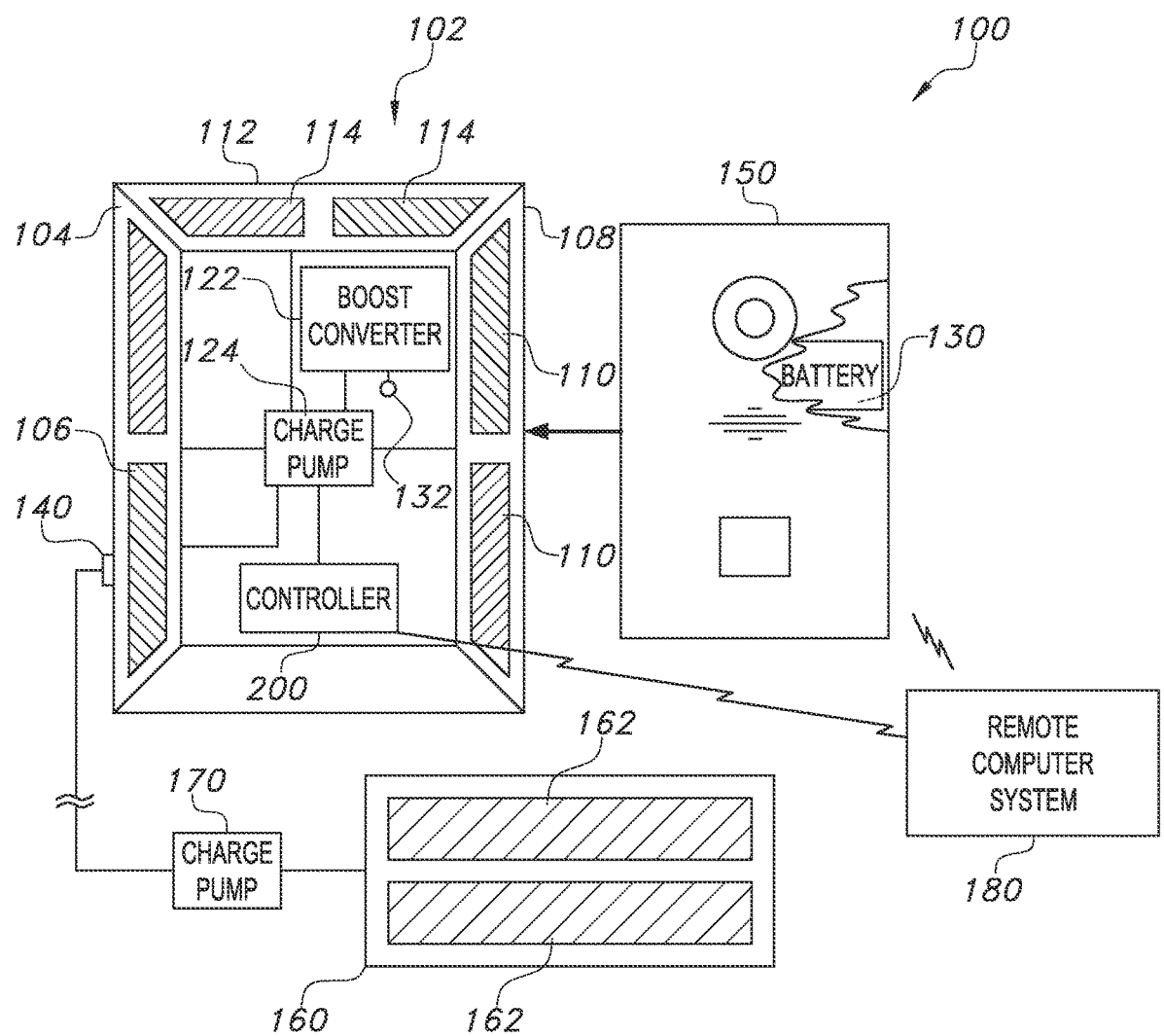
FIG. 1 is a graphical representation of an example implementation of a system.
Figure 2:
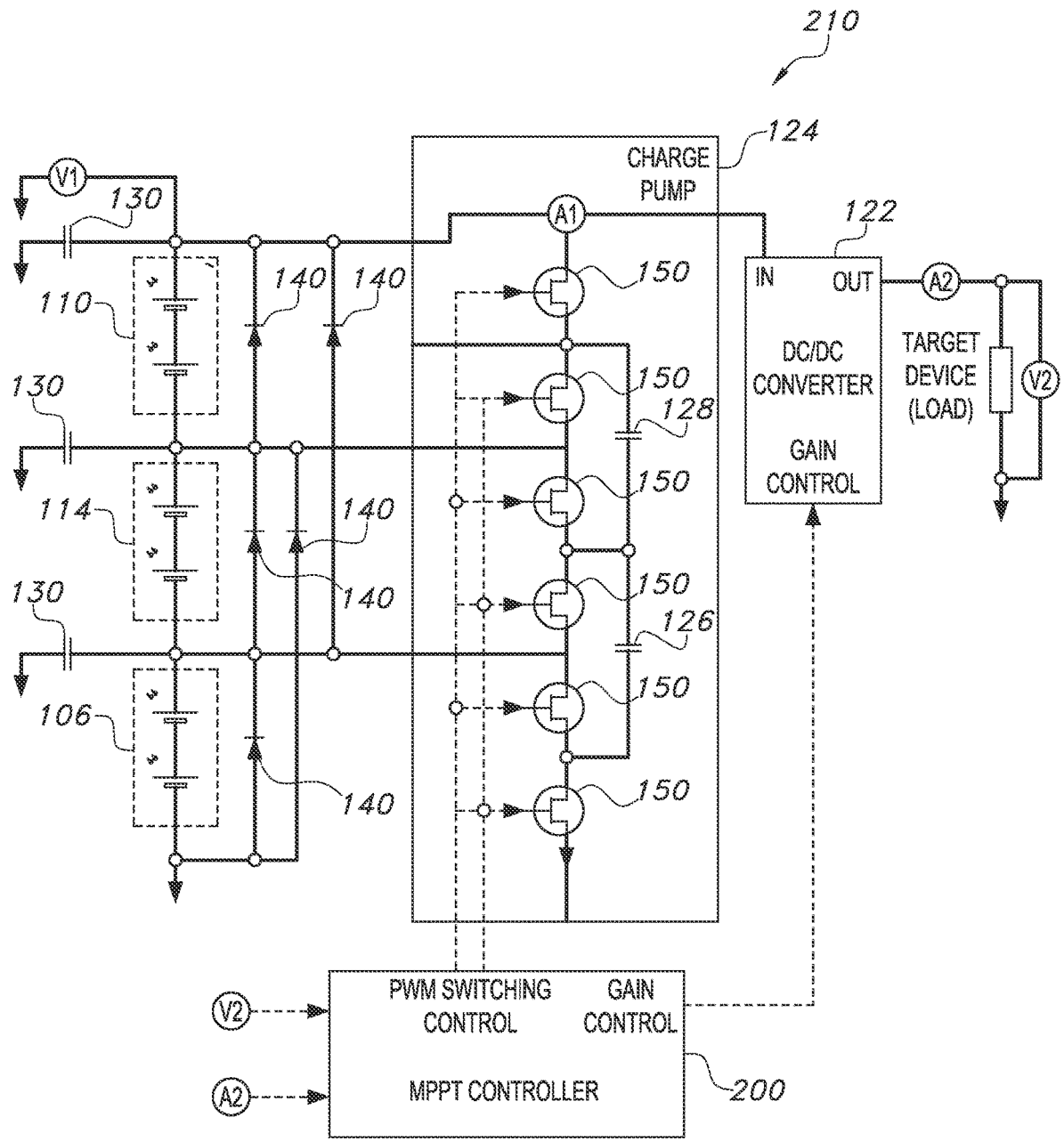
FIG. 2 is a schematic representation of an example implementation of the system.

As shown in FIGS. 1 and 2, a system 100 for charging a device includes: a housing 102 including a receptacle configured to receive a device 150; and a set of module faces 104, 108, 112 arranged in a mutually-angularly-offset orientation. The system 100 can further include: a first solar panel 106 including a first set of solar cells and arranged on a first module face 104 in the set of module faces 104, 108, 112; a second solar panel no including a second set of solar cells, arranged on a second module face 108 in the set of module faces 104, 108, 112, and connected in series to the first solar panel 106; and a third solar panel 114 including a third set of solar cells, arranged on a third module face 112 in the set of module faces 104, 108, 112, and connected in series to the first solar panel 106 and the second solar panel no. The system 100 can also include a charge pump 124 including: a first flying capacitor 126 connected between the first solar panel 106 and the third solar panel 114; and a second flying capacitor 126 connected between the second solar panel 110 and the third solar panel 114. The system 100 can also include a boost converter 122 including an input channel connected to the charge pump 124; and an output channel connectable to the device 150. In one variation of the example implementation, the system 100 can also include a controller configured to selectively switch connectivity between the first solar panel 106 and the first flying capacitor 126 to route current output by the first solar panel 106 to the input channel of the boost converter 122; and selectively switch connectivity between the second solar panel no and the second flying capacitor 128 to route current output by the second solar panel no to the input channel of the boost converter 122.

In one variation of the exemplary implementation, the system 100 can include a smart doorbell system including a truncated rectangular pyramid housing 102 defining a receptacle configured to receive a smart doorbell 150. The truncated rectangular pyramid housing 102 includes a first window defined within a first surface 104 of the truncated rectangular pyramid housing 102; a second window defined within a second surface 108 of the truncated rectangular pyramid housing 102 opposite the first surface 104 of the truncated rectangular pyramid housing 102; and a third window defined within a third surface 112 of the truncated rectangular pyramid housing 102 sharing a first edge with the first surface 104 and a second edge with the second surface 112. The system 100 can further include a first solar panel 106 including a first set of solar cells and arranged adjacent the first window; a second solar panel 110 including a second set of solar cells, arranged adjacent the second window, and connected to the first solar panel 106; and a third solar panel 114 including a third set of solar cells, arranged adjacent the third window, and connected to the first solar panel 106 and the second solar panel 110.

The system 100 can also include a charge pump 124 including a first flying capacitor 126 connected between the first solar panel 106 and the third solar panel 114; and a second flying capacitor 128 connected between the second solar panel no and the third solar panel 114. The system 100 can include a boost converter 122 including an input channel connected to the charge pump 124; and an output channel connectable to the smart doorbell 150. The system 100 can further include a controller 200 configured to selectively switch connectivity between the first solar panel 106 and the first flying capacitor 126 to route current output by the first solar panel 106 to the input channel of the boost converter 122; and selectively switch connectivity between the second solar panel no and the second flying capacitor 128 to route current output by the second solar panel no to the input channel of the boost converter 122.

As shown in the FIGURES, a solar power control system 210 can include a charge pump 124 including: a first flying capacitor 126 connectable to a first solar panel 106 arranged in a first plane and a third solar panel 114 arranged in a third plane substantially orthogonal to the first plane; and a second flying capacitor 128 connectable to a second solar panel no arranged in a second plane non-orthogonal to the first plane and the third solar panel 114. The power control system 210 can also include a boost converter 122 including an input channel and an output channel that is connectable to the charge pump 124 at the input channel and a device 150 at the output channel; and configured to control a gain signal. The power control system 210 can also include a controller 200 configured to: selectively switch connectivity between the first solar panel 106 and the first flying capacitor 126 and the second solar panel no and the second flying capacitor 128 to route current output by the charge pump 124 to the input channel of the boost converter 122; and selectively adjust a gain signal at the boost converter 122 on the output channel of the boost converter 122 to the device 150.

In one variation of the example implementation, the power control system 210 can also include a set of switches 150 arranged between the solar panels 106, 110, 114. In this variation of the example implementation, the controller 200 can be further configured to substantially concurrently: selectively switch connectivity between the first solar panel 106 and the first flying capacitor 126 and the second solar panel 110 and the second flying capacitor 128 to route current output by the charge pump 124 to the input channel of the boost converter 122; and selectively adjust a gain signal at the boost converter 122 on the output channel of the boost converter 122 to the device 150.

2. Applications

Generally, the system 100 includes a receptacle configured to physically interface with a battery-operated, internet-connected doorbell, such as a "smart doorbell" that includes a camera, motion sensors, and/or a physical button, is configured to transmit an image or video feed to an external device (e.g., a smartphone) responsive to detecting motion nearby and/or responsive to depression of the physical button, and that operates at a nominal voltage. The system 100 also includes a set of solar panels 106, 110, 114 arranged on angularly offset (e.g., orthogonal, prismatic, pyramidal, etc.) module faces 104, 108, 112 arranged about the receptacle and smart doorbell 150. Each solar panel 106, 110, 114 includes a set of solar cells connected in series, and the set of solar panels 106, 110, 114 are similarly arranged in series such that the output voltages across all solar cells sum to a total output voltage near the nominal voltage of the smart doorbell 150. The system 100 further includes a charge pump 124 configured: to equalize voltage across the solar panels 106, 110, 114; and to route current output by each solar panel 106, 110, 114 around a next solar panel 106, 110, 114 in the series—rather than through the next solar panel 106, 110, 114—in order to increase total current output of the solar panels 106, 110, 114 beyond the minimum current output by a least-effective solar panel 106, 110, 114 in the set during periods of uneven illumination across the set of solar panels 106, 110, 114. The solar panels 106, 110, 114 and the charge pump 124 can route this increased total output current at the total output voltage to a boost converter 122, which conditions this signal to the nominal voltage before outputting this conditioned signal to the smart doorbell 150 to charge its battery 130, thereby reducing frequency of battery replacement or eliminating battery replacement in the smart doorbell 150.

In particular, the system 100 includes solar cells and solar panels 106, 110, 114 arranged in series in order to achieve a high total output voltage across a minimum quantity of solar cells, thereby: reducing a quantity of connections between sequential solar cells; decreasing complexity of the system 100; enabling greater fill factor of solar cells on each module face of the housing 102; achieving greater energy capture per unit surface area of the housing 102; decreasing a voltage difference across the input and output channels of the boost converter 122; and thereby increasing efficiency of the boost converter 122.

The system 100 also includes a charge pump 124 configured to: intermittently connect flying capacitors 126, 128 interposed between two sequential solar panels 106, 110, 114 in order to extract energy from the first solar panel 106 in the pair; and to route this energy around the second solar panel 110 in the pair and to the output of the solar panels 106, 110, 114 such that the current output of the first solar panel 106 is not limited to the current output of the second solar panel 110 due to serial arrangement of these solar panels 106, 110, 114 when these solar panels are unevenly illuminated.

Therefore, the system 100 can be configured to: maximize fill factor of solar cells across each module face 104, 108, 112 of the housing 102; maintain high efficiency of the boost converter 122; and achieve total current output greater than the current output of the least-effective solar panel 106, 110, 114 in the set at any given time under both even and uneven illumination conditions.

The system 100 is described herein as a peripheral device configured to connect to a smart doorbell 150 in order to recharge a battery 130 in the smart doorbell 150 and reduce or eliminate battery replacement in the smart doorbell 150 over time. However, the solar panels 106, 110, 114 and power electronics 120 (e.g., the charge pump 124, boost converter 122, associated switches, transistors, etc.) of the system 100 can be combined with smart doorbell 150 components to form an integrated, solar-enabled smart doorbell. Additionally or alternatively, the solar panels 106, 110, 114 and power electronics 120 of the system 100 can be integrated into or configured to recharge another product including a device 150 of any type requiring electrical power. Example devices 150 can include smart home/business security components, systems, or subsystems, including for example: lights and lighting elements; cameras; signs; or combination subsystems (e.g., combined camera and lighting system).

Additionally, the system 100 can be integrated into any other suitable device that can use solar power to charge a battery or provide prime power requirements, including for example: an unmanned aerial vehicle; an unmanned marine vehicle; a mobile robotic system; an electric vehicle (e.g., in the form of a solar roof); or a mobile device (e.g., in the form of a solar-powered smartphone-charging case) that includes non-parallel solar panels that may be exposed to different, concurrent intensities of light throughout operation, including applications in which the intensity variation is a function of the geometry (e.g., non-planar geometry) of the system 100 as well as applications in which the intensity variation is a function of shading, sun-angle variation, seasonality, or time of day in a planar solar array.

Furthermore, the system 100 is described herein as including three solar panels in an example geometric configuration. However, the system 100 can include any other quantity or arrangement of solar panels 106, 110, 114 connected to a charge pump 124 in any desired geometry, including planar geometries in which there is variability in the power output of the set of solar panels 106, 110, 114. For example, irregular shading across a planar array, partial malfunction of a solar panel 106, 110, 114 within the array, partial malfunction of a solar cell within a solar panel 106, 110, 114, or partial blocking or obfuscation of a solar panel 106, 110, 114 through debris accumulation (e.g., salt, snow, dirt, etc.).

3. Solar Panel Power Output Variance

Generally, solar panels 106, 110, 114 in the system 100 may exhibit non-uniform power output over time due to changes in solar illumination and reflectance around the system 100 (i.e., "illumination") when the system 100 is deployed with a smart doorbell 150. Installed locations of the system 100—and solar illumination at these locations—may also vary greatly. For example, the system 100 and smart doorbell may be installed near a front door under a porch or on a gate post adjacent an unshaded gate. The system 100 can therefore include power electronics 120 to condition and merge outputs of these solar panels 106, 110, 114—which may be nearly identical at some times or very different depending upon the time of day, season, and latitude at which the solar panels 106, 110, 114 are located—into one common higher-voltage, higher-current output.

For example, for a smart doorbell 150 and system 100 installed in a north-facing orientation, the first solar panel 106 arranged on the first module face 104 of the housing 102 may receive predominant illumination, the third solar panel 114 on the third module face 112 of the housing 102 may receive some illumination, and the second solar panel 110 on the second module face 108 of the housing 102 may receive minimal illumination (e.g., from reflection) from sunrise through mid-morning (e.g., 5 AM until 10 AM). Therefore, in this example: the first solar panel 106 may generate an average of 100 milliwatts and a peak of 200 milliwatts of power at an average operating voltage of 1.12 Volts during this morning period; the third solar panel 114 may generate an average of 50 milliwatts and a peak of 200 milliwatts of power at an average operating voltage of 1.09 Volts during this morning period; and the second solar panel 110 may generate an average of 5 milliwatts and a peak of 20 milliwatts of power at an average operating voltage of 1.0 Volt during this morning period if these solar panels 106, 110, 114 are disconnected and operated independently. If these solar panels 106, 110, 114 are connected in series without the power electronics 120, the total output of the set of solar panels 106, 110, 114 may drop to an average of 5 milliamps over 3.21 Volts and 16 milliwatts output power.

In the foregoing example, the first solar panel 106 on the first module face 104 of the housing 102 may receive some illumination (e.g., from both reflection and direct illumination), the third solar panel 114 on the third module face 112 of the housing 102 may receive predominant illumination, and the second solar panel 110 on the second module face 108 of the housing 102 may receive some illumination from mid-morning to mid-afternoon (e.g., 10 AM until 3 PM). Therefore, the first solar panel 106 may generate an average of 150 milliwatts and a peak of 300 milliwatts of power at an average operating voltage of 1.15 Volts during this midday period; the third solar panel 114 may generate an average of 300 milliwatts and a peak of 350 milliwatts of power at an average operating voltage of 1.2 Volts during this midday period; and the second solar panel 110 may generate an average of 150 milliwatts and a peak of 300 milliwatts of power at an average operating voltage of 1.15 Volts during this midday period if these solar panels 106, 110, 114 are disconnected and operated independently. If these solar panels 106, 110, 114 are connected in series without the power electronics 120, the total output of the set of solar panels 106, no, 114 may drop to an average of 130 milliamps over 3.5 Volts and 456 milliwatts output power.

Furthermore, in this example, the first solar panel 106 on the first module face 104 of the housing 102 may receive minimal illumination (e.g., from reflection), the third solar panel 114 on the third module face 112 of the housing 102 may receive some illumination, and the second solar panel no on the second module face 108 of the housing 102 may receive predominant illumination from mid-afternoon to dusk (e.g., 3 PM until 8 PM). Therefore, in this example: the first solar panel 106 may generate an average of 5 milliwatts and a peak of 20 milliwatts of power at an average operating voltage of 1.0 Volt during this evening period; the third solar panel 114 may generate an average of 50 milliwatts and a peak of 200 milliwatts of power at an average operating voltage of 1.09 Volts during this evening period; and the second solar panel no may generate an average of 100 milliwatts and a peak of 200 milliwatts of power at an average operating voltage of 1.12 Volts during this evening period. If these solar panels 106, 110, 114 are connected in series without the power electronics 120, the total output of the set of solar panels 106, 110, 114 may drop to an average of 5 milliamps over 3.21 Volts and 16 milliwatts output power.

Therefore, the effective operating voltage and power output of each solar panel 106, 110, 114 in the first, third, and second module faces 104, 112, 108 may vary significantly over time during a single day and may differ significantly between solar panels 106, 110, 114 (e.g., by up to 200 milliwatts and 0.2 Volts between two solar panels at any single instant in time). Furthermore, differences in output power and current from these solar panels 106, 110, 114 under uneven illumination may significantly reduce total power output of the set of solar panels 106, 110, 114 arranged in series.

Accordingly, the set of solar panels 106, 110, 114 can be arranged in series in order to achieve a total output voltage of these solar panels 106, 110, 114 that approaches the nominal output voltage of the system 100 (e.g., a target output voltage of a boost convertor 122 connected to an output of the set of solar panels 106, 110, 114); and the system 100 can include a multi-level charge pump 124 configured to route energy output by one solar panel around subsequent solar panels in this series such that total output current of the set of solar panels 106, 110, 114 exceeds the maximum output current of the least-effective or least-productive solar panel in the set at any given time (e.g., approximates the sum of all solar panel output currents or approximates the output current of the most effective or productive solar panel at any given time).

Accordingly, the system 100 can increase efficiency of the boost converter 122 while also achieving greater total output current of the solar panels 106, 110, 114, thereby enabling the system 100 to supply greater power to the smart doorbell 150 for a given amount of incident light on the system 100 at any time, thus extending a charge life of a battery 130 and reducing frequency of battery replacement in the smart doorbell 150.

4. Housing

As shown in FIG. 1, the housing 102 can define a rectangular section and a truncated rectangular pyramidal volume, including: a receptacle arranged on a front face of the housing 102 and configured to receive and locate a smart doorbell 150; and first, third, and second edges along the front of the housing that are beveled (or "chamfered") to form a set of three module faces 104, 108, 112 angularly offset from the front face of the housing 102. For example, the first module face 104 can be angularly offset from the face of the housing by 45° about a z-axis of the housing 102; the third module face 112 can be angularly offset from the face of the housing by 45° about a y-axis of the housing 102; and the second module face 108 can be angularly offset from the face of the housing by −45° about a z-axis of the housing 102, thereby generally forming a truncated rectangular pyramid. Therefore, in this example configuration, the first and second module faces 104, 108 are orthogonal, and the third module face 112 is orthogonal to the first and second module faces 104, 108. Therefore, light incident on the housing 102 within a horizontal plane through the housing 102 may fall on one of the first and second module faces 104, 108 over a full angular range of 0° to 180° about the z-axis of the housing 102. Furthermore, light incident on the housing 102 within a vertical plane through the housing 102 may fall on the third module face 112 over a full angular range of 0° to 90° about the y-axis of the housing 102.

(In one variation of the example implementation, a bottom edge along the front of the housing 102 is also beveled to form a fourth, bottom module face angularly offset from the face of the housing by −45° about the y-axis of the housing. Therefore, the third module face 112 and bottom module face are orthogonal, and light incident on the housing 102 within the vertical plane through the housing 102 may fall on at least one of the third module face 112 and bottom module faces over a full angular range of −90° to 90° about the y-axis of the housing 102, and third solar panels 114 and bottom solar panels arranged on these module faces may capture and output energy as a function of illumination of these surfaces.)

Each module face 104, 108, 112 can also include a window configured to receive and locate a solar panel 106, 110, 114 (or a set of individual solar cells).

The housing 102 can be configured in any geometry suitable for receiving and locating a device 150, including substantially planar or polygonal geometries that are suited to expose one or more faces (or portions of faces) to incident sunlight for charging the battery 130 and/or powering the device 150. For example, a security camera housing 102 can generally define a rectangular prism in which at least four faces can include solar panels for charging the battery 130 and/or powering the security camera. Similarly, a lighted security sign housing 102 can generally define a hexagonal cross section with at least six faces including solar panels for charging the battery and/or powering the lighted security sign. In another example, a security camera or lighting housing 102 can generally define a cylindrical volume in which a set of solar cells are mounted along a portion of the perimeter of the circular cross section and a top circular module face.

In one implementation, the housing 102 is manufactured by injection molding a UV-stable plastic. However, the housing 102 can be stamped, fabricated, formed, or otherwise manufactured in metal (e.g., aluminum) or any other material. In a variation of the example implementation, the housing 102 can be manufactured by advanced manufacturing or three-dimensional printing to embody a custom geometry. For example, the housing 102 can be custom-designed and made to order via advanced manufacturing to specify the geometric relationship of the set of solar panels 106, 110, 114 to optimize solar collection for any particular environment or location.

5. Solar Cell and Solar Panel

The set of solar panels 106, 110, 114 (or "solar modules") includes first, third, and second solar panels 106, 114, 110. Each solar panel includes a set of solar cells arranged in series to yield an effective voltage output of the solar panel 106, 110, 114 that exceeds the individual maximum open-circuit voltage of each solar cell when illuminated. Each solar panel 106, 110, 114 is also configured to install in a window of a corresponding module face 104, 108, 112 on the housing 102.

In one implementation, each solar cell (or "photovoltaic cell") in a solar panel 106, 110, 114 includes a single junction silicon solar cell configured to produce a maximum open-circuit voltage of between 0.5 and 0.6 Volts.

In one configuration in which the system 100 is configured to supply current to the device 150 at a nominal voltage of 5 Volts to recharge the battery 130 in the device 150, each solar panel 106, 110, 114 includes a set of four solar cells arranged in series to produce an effective voltage of approximately 2.4 Volts when illuminated. With the three first, third, and second solar panels 106, 114, no arranged in series and installed on the first, third, and second module faces 104, 112, 108 of the housing 102, these solar panels 106, 110, 114 may output a peak voltage of 7.2 Volts at peak illumination. In particular, rather than include twelve solar cells in each solar panel 106, 110, 114 to achieve a peak voltage of 7.2 Volts in each solar panel 106, no, 114 and rather than connecting these solar panels 106, 110, 114 in parallel, each solar panel 106, no, 114 in the system 100 can include fewer (i.e., four) solar cells, and these solar panels 106, 110, 114 can be connected in series to achieve the same or similar peak voltage of 7.2 Volts while also: increasing fill factor (e.g., from 70% to 95%) across the area of each module face 104, 108, 112 including a continuous solar cell across a region of the solar panel 106, 110, 114 rather than multiple discrete solar cells offset by non-trivial gaps widths; and reducing complexity, system cost, and opportunities for failure by reducing part count per solar panel 106, 110, 114.

In another configuration in which the system 100 is configured to supply current to the device 150 at a nominal voltage of 3.3 Volts to recharge the battery 130 in the device 150, each solar panel 106, 110, 114 includes a set of three solar cells arranged in series to produce an effective voltage of approximately 1.8 Volts when illuminated. With the three first, third, and second solar panels 106, 114, no arranged in series and installed on the first, third, and second module faces 104, 112, 108 of the housing 102, these solar panels 106, 110, 114 may output a peak voltage of 5.4 Volts at peak illumination. In particular, rather than include nine solar cells in each solar panel 106, 110, 114 to achieve a peak voltage of 5.4 Volts in each solar panel and rather than connecting these solar panels 106, 110, 114 in parallel, each solar panel 106, 110, 114 in the system 100 can include fewer (i.e., three) solar cells, and these solar panels 106, 110, 114 can be connected in series to achieve the same or similar peak voltage of 5.4 Volts while also: increasing fill factor (e.g., from 75% to 97%) across the area of each module face 104, 108, 112 including a continuous solar cell across a region of the solar panel 106, 110, 114 rather than multiple discrete solar cells offset by non-trivial gaps widths; and reducing complexity, system cost, and opportunities for failure by reducing part count per solar panel 106, 110, 114.

In another configuration shown in FIG. 1 in which the system 100 is configured to supply current to the device 150 at a nominal voltage of 2 Volts to recharge the battery 130 in the device 150, each solar panel 106, 110, 114 includes a set of two solar cells arranged in series to produce an effective voltage of approximately 1.2 Volts when illuminated. With the first, third, and second solar panels 106, 114, 110 arranged in series and installed on the first, third, and second module faces 104, 112, 108 of the housing 102, these solar panels 106, 110, 114 may output a peak voltage of 3.2 Volts at peak illumination. In particular, rather than include six solar cells in each solar panel to achieve a peak voltage of 3.2 Volts and rather than connecting these solar panels 106, 110, 114 in parallel, each solar panel 106, 110, 114 in the system 100 can include fewer (i.e., two) solar cells, and these solar panels 106, 110, 114 can be connected in series to achieve the same or similar peak voltage of 3.2 Volts while also: increasing fill factor (e.g., from 80% to 99%) across the area of each module face 104, 108, 112 including a continuous solar cell across a region of the solar panel 106, 110, 114 rather than multiple discrete solar cells offset by non-trivial gaps widths; and reducing complexity, system cost, and opportunities for failure by reducing part count per solar panel 106, 110, 114.

In the variation described above in which the housing 102 further includes a bottom module face and in which the system 100 is configured to supply current to the device 150 at a nominal voltage of 5 Volts to recharge the battery 130 in the device 150, each solar panel 106, 110, 114 includes a set of three solar cells arranged in series to produce an effective voltage of approximately 1.8 Volts when illuminated. With the four first, third, second, and bottom solar panels arranged in series and installed on the first, third, second, and bottom module faces of the housing 102, these solar panels 106, no, 114 may output a peak voltage of 7.2 Volts at peak illumination.

In the foregoing configurations, the first and second solar panels 106, 110 can define rectangular footprints—such as 14 millimeters by 60 millimeters—and can be configured to extend up to (or very near) the edges of the first and second module faces 104, 108, respectively. Similarly, the third solar panel 114 can define a rectangular footprint—such as 14 millimeters by 40 millimeters—and can be configured to extend up to (or very near) the edges of the third module face 112.

In alternative housing 102 geometries configured for receiving and locating any one or more of the devices 150 described above, the relative geometries of the solar panels 106, 110, 114 can be complementary in size and shape to accommodate the requisite number of solar panels 106, no, 114 to recharge the battery 130 and/or power the device 150. Moreover, as noted above, some housing 102 geometries may include more than three solar panels 106, 110, 114, or solar panels 106, 110, 114 of customized or standardized geometry to most efficiently provide power to the associated batteries 130 and/or devices 150.

Furthermore, each solar panel 106, 110, 114 can be installed in a window on a corresponding module face 104, 108, 112 of the housing 112, such as by heat-staking; fastening with a mechanical fastener (e.g., rivet, threaded fastener); or by bonding (e.g., with an adhesive, caulk, or potting material).

6. Power Electronics

Figure 3:
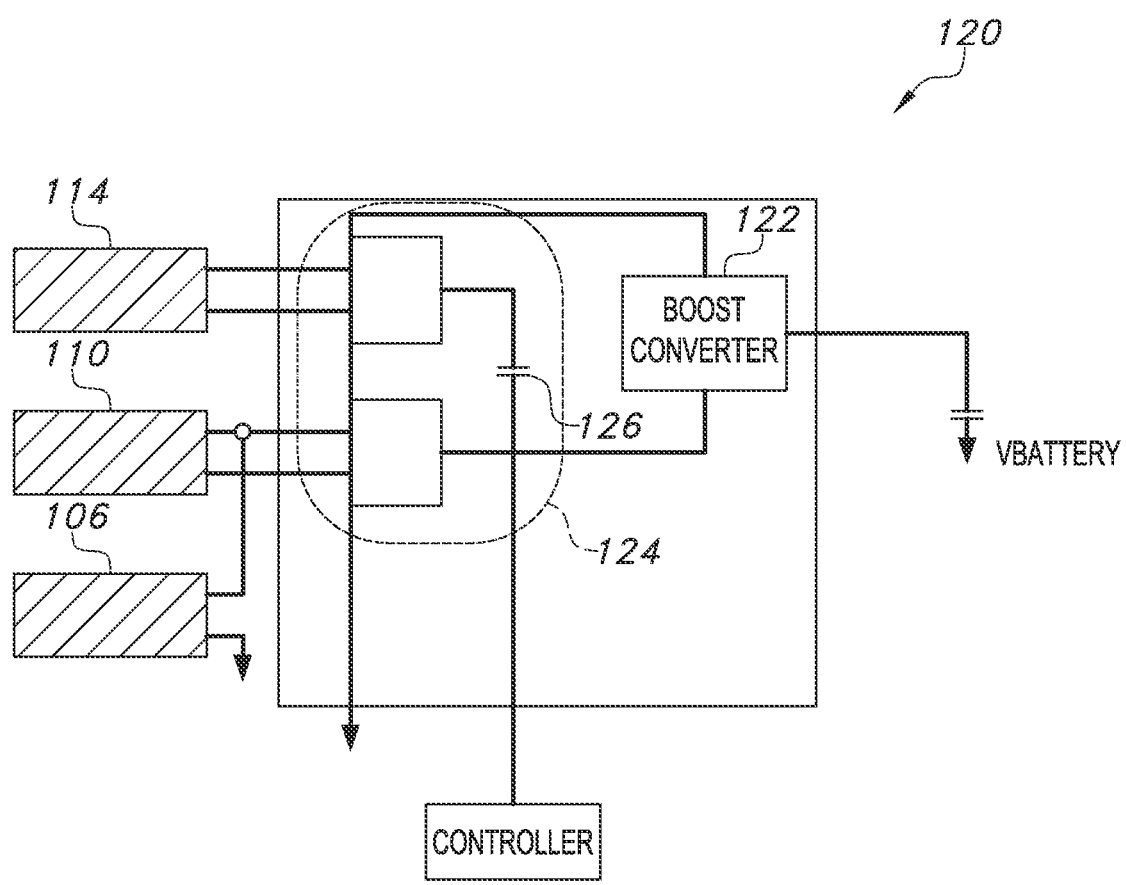
FIG. 3 is a schematic representation of one variation of the example implementation of the system.

As shown in FIGS. 1, 2 and 3, the system 100 also includes a power electronics module 120, which can include: a charge pump 124 including a first pump level and a first flying capacitor 126 arranged between the first and second solar panels 106, no and including a second pump level and a second flying capacitor 128 arranged between the second and third solar panels 110, 114; and a boost converter 122 connected to the output of the set of solar panels 106, 110, 114 and configured to boost the output voltage of the set of solar panels 106, 110, 114 to a target or nominal voltage.

Generally, the multi-level charge pump 124: draws current out of an output side of a first, more-illuminated solar panel 106 to energize a first flying capacitor 126 during a first pump stage; connects this first, energized flying capacitor 126 to an output side of a second, less-illuminated solar panel 110 during a second pump stage in order to drive the voltage across the second solar panel no (near) to the voltage across the first solar panel 106 and to route excess energy from the first solar panel 106 around the second solar panel 110 such that the current output of the first, more-illuminated solar panel 106 is not limited by the second, less-illuminated solar panel 110.

In particular, current output of a solar panel 106, 110, 114 may be a function of incident light intensity, and the maximum current through a set of solar panels 106, 110, 114 arranged in series (without the charge pump 124) is limited to the lowest current output of any single solar panel in the set. Therefore, for the set of solar panels arranged in series (without the charge pump), the total current output of the set of solar panels 106, no, 114 is limited to the current output by the least effective or least productive solar panel 106, 110, 114 at any given time. Moreover, the effectiveness or productivity of any one of the set of solar panels 106, 110, 114 can vary throughout a day, season, or year, depending upon the conditions in which the system 100 is deployed.

Thus, the system 100 can include a charge pump 124 configured to selectively: energize a first flying capacitor 126 between a first, more-illuminated solar panel 106 and a second, less-illuminated solar panel 10 with excess current output by the former (e.g., with a current output of the first solar panel 106, less the current output of the second solar panel no) during a first pump stage; and then release energy stored in the first flying capacitor 126 to the output of the set of solar panels 106, 110, 114 during a second pump stage. Therefore, the charge pump 124 can function to increase the total output current of the set of solar panels 106, 110, 114 beyond the lowest output current of any one solar panel in the set.

Furthermore, because voltage across a solar panel may also be a function of incident light intensity, the charge pump 124 can raise (or equalize) voltages across the second, less-illuminated or less productive solar panel 110 to (near) a voltage across the first, more-illuminated or more productive solar panel 106 in the set by connecting the first flying capacitor 126 to the output side of the second solar panel no during the second pump stage. Therefore, the charge pump 124 can maximize a total voltage across these serially connected solar panels 106, 110, 114, thus reducing the difference between the output voltage of the solar panel and the output voltage of the boost converter 122, and thereby increasing efficiency of the boost converter 122.

In particular, the charge pump 124 oscillates a set of pump levels between pump stages in order to selectively energize flying capacitors 126, 128 between adjacent solar panels 106, 110, 114 and to drive voltages across these solar panels 106, 110, 114 to a common (high) voltage (e.g., 1.2 Volts for two-cell solar panels) during uneven illumination of the system 100, including by: energizing a first flying capacitor 126 during a first pump stage with excess current output by a first, more-illuminated solar panel 106; connecting the flying capacitor 126—now energized to the voltage across the first solar panel 106—to the output side of the second next, less-illuminated solar panel 110 to increase voltage across the second solar panel no during the second pump stage; and redirecting energy stored in the first flying capacitor 126 around the second solar panel no to sum with currents output by the second solar panel no and the third solar panel 114 before the input of the boost converter 122.

A second level of the charge pump 124—including a second flying capacitor 128—arranged between the second solar panel 110 and the third solar panel 114 can implement the same process to route excess energy from the second solar panel 110 around the third solar panel 114 and to raise the voltage across the third solar panel 114 response to greater illumination of the second solar panel no than the third solar panel 110.

In variations of the example implementation described above, the system 100 can include an arbitrary number of solar panels connected with a multi-stage charge pump of the type described above. As described in more detail below, an example charge pump can include a flying capacitor for each pairing of outputs from the set of solar panels. In a set of N serially connected solar panels, the multi-stage charge pump can include N−1 flying capacitors arranged in the configuration described above. Moreover, in a set of solar panels that are connected in a hybrid configuration, (e.g., subsets of solar panels connected in parallel), in turn connected serially to other sets of solar panels or other individual solar panels, each output from a parallel-connected subset can be treated as a single output. Accordingly, in a hybrid configuration the multi-stage charge pump can include a flying capacitor disposed between each solar panel output, including parallel outputs from solar panels connected in parallel.

6.1 Serial Flying Capacitor Configuration

In one implementation, the charge pump 124 includes: a controller (or a secondary control circuit) 200; a set of flying capacitors 126, 128 connected in series between the set of solar panels 106, 110, 114 and configured to energize when connected to a preceding solar panel during a first pump stage and to redistribute this energy to the output of the set of solar panels 106, 110, 114; and a set of switches (e.g., two high-side and two low-side transistors) configured to oscillate connectivity of each flying capacitor 126, 128 between its two adjacent solar panels.

The following example implementations illustrate a configuration and example order of serial or parallel connections between the set of solar panels 106, 110, 114 and the flying capacitors 126, 128 in a device 150 and housing 102 defining a particular geometry and with an example pattern of incident sunlight. In other configurations, the placement and the order of the serial or parallel connections between the solar panels 106, 110, 114 and the flying capacitors 126, 128 can vary, depending upon the geometry of the housing 102, the orientation of the system 100, and the prevailing pattern of incident sunlight.

6.1.1 Morning Operation

In one example implementation: the first, second, and second solar panels 106, 110, 114 are serially connected in this order; a first level of the charge pump 124 is connected to the first solar panel 104; a first flying capacitor 126 is arranged between the first solar panel 106 and third solar panel 114; a second level of the charge pump 124 is connected to the third solar panel 114; a second flying capacitor 128 is arranged between the third solar panel 114 and second solar panel 110; and a third level of the charge pump is connected to the second solar panel no; and the system 100 is arranged in a north-facing orientation. In this example implementation, the first solar panel 106 may be highly illuminated (e.g., facing the rising sun), the third solar panel 114 may be moderately illuminated (e.g., facing upwards), and the second solar panel 110 may be minimally illuminated (e.g., partially shaded) during the morning period described above.

For example: the first solar panel 106 may generate an average of 100 milliwatts and a peak of 200 milliwatts of power at an average operating voltage of 1.12 Volts during this morning period; the third solar panel 114 may generate an average of 50 milliwatts and a peak of 200 milliwatts of power at an average operating voltage of 1.08 Volts during this morning period; and the second solar panel 110 may generate an average of 5 milliwatts and a peak of 20 milliwatts of power at an average operating voltage of 1.0 Volt during this morning period, as described above.

During morning operation, the controller 200 can transition switches in the first and third pump levels to the first pump stage and transition switches in the second pump level to the second pump stage, which: connects the first flying capacitor 126 to the output of the first solar panel 106; energizes the first flying capacitor 126 with current output by the first solar panel 106 (e.g., current output by the first solar panel in excess of current output by the third solar panel 114; or all current output by the first solar panel 106); and discharges the second flying capacitor 128 to the output of the set of solar panels 106, 110, 114. For example, the charge pump 124 can energize the first flying capacitor 126 with an average of 100 milliwatts during this first pump stage; and the second flying capacitor 128 can release an average of 50 milliwatts to the output of the set of solar panels 106, 110, 114 and increase the average voltage across the second solar panel 110, such as from an average of 1.0 Volts to an average of 1.05 Volts during this second pump stage.

The controller 200 can then invert these switches to transition the first and third pump levels to the second pump stage and to transition the second pump level to the first pump stage, which: discharges the first flying capacitor 126 to the output of the set of solar panels 106, 110, 114; connects the second flying capacitor 128 to the output of the third solar panel 114; and energizes the second flying capacitor 128 with current output by the third solar panel 114 (e.g., current output by the third solar panel 114 in excess of current output by the second solar panel 110; or all current output by the third solar panel 114). For example, the charge pump 124 can energize the second flying capacitor 128 with an average of 50 milliwatts during this first pump stage; the first flying capacitor 126 can release an average of 100 milliwatts to the output of the set of solar panels 106, 110, 114 and increase the average voltage across the third solar panel 114, such as from an average of 1.09 Volts to an average of 1.10 Volts during this second pump stage; and the third level of the charge pump 124 can release an average of 5 milliamps from the second solar panel 110 to the output of the set of solar panels 106, 110, 114.

Therefore, during this complete first-second pump stage cycle during morning operation of the system 100, the charge pump 124 can: produce an average total output of 155 milliwatts from the set of solar panels 106, 110, 114 at an average total voltage of 3.25 Volts (i.e., within 1.5% of the nominal output voltage of the boost converter given a total of 6 cells across the first solar panel 106, third solar panel 114, and second solar panel 110).

6.1.2 Midday Operation

In the foregoing example implementation, during a midday operation, the first solar panel 106 may be moderately illuminated, the third solar panel 114 may be highly illuminated, and the second solar panel no may be moderately illuminated.

For example: the first solar panel 106 may generate an average of 150 milliwatts and a peak of 300 milliwatts of power at an average operating voltage of 1.15 Volts during a midday period; the third solar panel 114 may generate an average of 300 milliwatts and a peak of 350 milliwatts of power at an average operating voltage of 1.2 Volts during this midday period; and the second solar panel 110 may generate an average of 150 milliwatts and a peak of 300 milliwatts of power at an average operating voltage of 1.15 Volts during this midday period, as described above.

During midday operation, the controller 200 can transition switches in the first and third pump levels to the first pump stage and transition switches in the second pump level to the second pump stage, which: connects the first flying capacitor 126 to the output of the first solar panel 106; energizes the first flying capacitor 126 with current output by the first solar panel 106 (e.g., current output by the first solar panel 106 in excess of current output by the third solar panel 114; or all current output by the first solar panel 106); and discharges the second flying capacitor 128 to the output of the set of solar panels 106, 110, 114. For example, the charge pump 124 can energize the first flying capacitor 126 with an average of 150 milliwatts during this first pump stage; and the second flying capacitor 128 can release an average of 300 milliwatts to the output of the set of solar panels 106, 110, 114 and increase the average voltage across the second solar panel 110, such as from an average of 1.15 Volts to an average of 1.17 Volts during this second pump stage.

The controller 200 can then invert these switches to transition the first and third pump levels to the second pump stage and to transition the second pump level to the first pump stage, which: discharges the first flying capacitor 126 to the output of the set of solar panels 106, 110, 114; connects the second flying capacitor 128 to the output of the third solar panel 114; and energizes the second flying capacitor 128 with current output by the third solar panel 114 (e.g., current output by the third solar panel 114 in excess of current output by the second solar panel 110; or all current output by the third solar panel 114). For example, the charge pump 124 can energize the second flying capacitor 128 with an average of 300 milliwatts during this first pump stage; the first flying capacitor 126 can release an average of 250 milliwatts to the output of the set of solar panels 106, 110, 114 during this second pump stage; and the third level of the charge pump can release an average of 250 milliamps from the second solar panel 110 to the output of the set of solar panels 106, 110, 114.

Therefore, during this complete first-second pump stage cycle during midday operation of the system 100, the charge pump 124 can: produce an average total output of 155 milliwatts from the set of solar panels 106, 110, 114 at an average total voltage of 3.52 Volts.

6.1.3 Evening Operation

Furthermore, in the foregoing example implementation operating in the evening, the first solar panel 106 may be moderately illuminated, the third solar panel 114 may be highly illuminated, and the second solar panel no may be highly illuminated.

For example: the first solar panel 106 may generate an average of 5 milliwatts and a peak of 20 milliwatts of power at an average operating voltage of 1.0 Volt during this evening period; the third solar panel 114 may generate an average of 50 milliwatts and a peak of 200 milliwatts of power at an average operating voltage of 1.09 Volts during this evening period; and the second solar panel 110 may generate an average of 100 milliwatts and a peak of 200 milliwatts of power at an average operating voltage of 1.12 Volts during this evening period, as described above.

During evening operation, the controller 200 can transition switches in the first and third pump levels to the first pump stage and transition switches in the second pump level to the second pump stage, which: connects the first flying capacitor 126 to the output of the first solar panel 106; energizes the first flying capacitor 126 with current output by the first solar panel 106 (e.g., current output by the first solar panel 106 in excess of current output by the third solar panel 114; or all current output by the first solar panel 106); and discharges the second flying capacitor 128 to the output of the set of solar panels 106, 110, 114. For example, the charge pump 124 can energize the first flying capacitor 126 with an average of 5 milliwatts during this first pump stage; and the second flying capacitor 128 can release an average of 50 milliwatts to the output of the set of solar panels 106, 110, 114 during this second pump stage.

The controller 200 can then invert these switches to transition the first and third pump levels to the second pump stage and to transition the second pump level to the first pump stage, which: discharges the first flying capacitor 126 to the output of the set of solar panels 106, 110, 114; connects the second flying capacitor 128 to the output of the third solar panel 114; and energizes the second flying capacitor 128 with current output by the third solar panel 114 (e.g., current output by the third solar panel 114 in excess of current output by the second solar panel 110; or all current output by the third solar panel 114). For example, the charge pump 124 can energize the second flying capacitor 128 with an average of 50 milliwatts during this first pump stage; the first flying capacitor 126 can release an average of 5 milliwatts to the output of the set of solar panels 106, 110, 114 during this second pump stage; and the third level of the charge pump 124 can release an average of 100 milliamps from the second solar panel 110 to the output of the set of solar panels 106, 110, 114.

Therefore, during this complete first-second pump stage cycle during evening operation of the system 100, the charge pump 124 can: produce an average total output of 155 milliwatts from the set of solar panels 106, 110, 114 at an average total voltage of 3.23 Volts.

Thus, the charge pump 124 can cooperate with the controller 200 and/or the set of solar panels 106, 110, 114 to maintain a high and consistent total voltage across the set of solar panels 106, 110, 114 while concurrently maintaining high total output current—in excess of the output current of a least-effective solar panel in the set—over a wide range of incident lighting conditions and on the system 100 and therefore over a wide range of output powers of the individual solar panels 106, 110, 114.

6.2 Flying Capacitor Configuration

In one implementation shown in FIG. 2, the flying capacitors 126, 128 are connected in parallel to a common line such that capacity of these flying capacitors sums 126, 128. (In this implementation, the flying capacitors may be exposed to higher voltages than the voltages across individual solar panels 106, 110, 114 and can therefore be configured for higher peak operating voltages.)

In another implementation, the flying capacitors 126, 128 are connected in series and arranged between the first solar panel 106 and the third solar panel 114 and between the third solar panel 114 and the second solar panel 110 such that each individual flying capacitor is exposed to a maximum voltage equal to a maximum voltage across a single solar panel in the system 100. (In this implementation, the capacity of the flying capacitors 126, 128 may be a function of C/n, wherein C is the capacitance of an individual flying capacitor and n is the quantity of flying capacitors in the charge pump.)

6.3 Hybrid Parallel-Series Solar Panels

In one variation of the example implementation shown in FIG. 3, the first solar panel 106 and second solar panel 110 are connected in parallel to form a lateral solar panel assembly such that the voltage across the first solar panel 106 and the second solar panel 110 are identical while the total current output of the lateral solar panel assembly is the sum of currents output by these individual solar panels 106, 110. In this variation, the lateral solar panel assembly is connected in series to the third solar panel 114, and a two-level charge pump 124 with a single flying capacitor 126 is connected between the lateral solar panel assembly and the third solar panel 114.

For example, the system 100 can be arranged in this configuration for deployment in lower latitudes exhibiting high sun altitudes. Because the first and second solar panels 106, 110 are arranged on orthogonal faces and because the system 100 is installed in locations with high sun altitudes, one—but commonly not both—of the first and second solar panels 106, no may be well-illuminated, may therefore output significantly more current than the other solar panel in the lateral solar panel assembly, and may output significantly more current than the third solar panel 114 during certain times of day, such as from dawn until mid-morning and from mid-afternoon until dusk. Furthermore, the first and second solar panels 106, no may output similar, lower currents at similar voltages from mid-morning to mid-afternoon, and the third solar panel 114 may output much greater current during this period.

Therefore, by connecting the first and second solar panels 106, 110 in parallel, the system 100 can achieve maximum total current output from the lateral solar panel assembly with minimal complexity and minimal additional circuit components while accommodating for high variance in output power of the first and second solar panels 106, 110 within a single day. However, by connecting the lateral solar panel assembly and the third solar panel 114 in series, the system 100 can achieve greater total voltage across the set of solar panels 106, 110, 114, reduce a difference between the input and output voltages of the boost converter 122, and thus increase efficiency of the boost converter 122.

6.4 Charge Pump Level by Individual Solar Cell

In one variation, rather than connect sets of solar cells in series to form individual solar panels and that arrange these solar panels—each paired with a pump level in the charge pump 124—in series, each solar cell in each solar panel 106, 110, 114 can be paired with its own pump level and flying capacitor (except the last solar cell in the series), and each pump level and flying capacitor can cooperate to route current output from its corresponding solar cell to the output of the solar cell series and to increase the voltage across a next solar cell in the series.

For example, for the system 100 described above that includes three solar panels, each includes a pair of solar cells for a total of six solar cells, the charge pump 124 can include six pump levels and five flying capacitors.

6.5 Boost Converter

The boost converter 122 (and/or buck converter) can then boost (or buck) the total output voltage of the set of solar panels 106, 110, 114 to the nominal input voltage of the device 150. For example, the output of the boost converter 122 can be connected to a cable or pin receptacle 132 passing though the housing 102. The system 100 can therefore be connected to the device 150 via this cable or pin receptacle 132, and a charging circuit with the device 150 can condition power output from the system 100 to recharge a battery 130 within the device 150. As described herein, the boost converter 122 can include any electronic device, circuit, or component that is configured to: receive a DC input (e.g., from the charge pump 124) and adjustably or variably control the gain of the DC input, for example through a gain signal received by the controller 200.

7. Peripheral Solar Panel

In one variation, the system 100 includes a port 140 configured to connect to a secondary peripheral solar panel 160. For example, a user may install the system 100 near a front door shared by a porch, which may reduce peak and average light exposure on the system 100 and thus reduce power output of the system 100 to the device 150 over time. Therefore, the system 100 can include a port 140 configured to connect a secondary peripheral solar panel 160 to the power electronics 120 and to increase power output of the system 100. Accordingly, the user may install the secondary peripheral solar panel 160 on a post supporting the roof or directly on the roof over the porch and connect the output of the secondary peripheral solar panel 160 to the port on the system 100 in order to increase output power of the system 100, achieve a greater charging rate of the battery 130 in the device 150, and decrease frequency of battery replacement in the device 150.

For example, the secondary peripheral solar panel 160 can include a quantity of solar cells 162 equal to the number of solar cells in the system 100, located in a single plane, and arranged in series such that the output voltage of the secondary peripheral solar panel 160 approximates the output voltage of the set of solar panels 106, 110, 114 in the system 100 under similar lighting conditions. Alternatively, the solar cells 162 in the secondary peripheral solar panel 162 can be arranged on different aspects or faces of the secondary peripheral solar panel 160, and the secondary peripheral solar panel 160 can further include a charge pump 170 arranged in a configuration similar to the charge pump 124 described above in order to augment voltage and current outputs across these solar cells 162 during periods of uneven illumination across these solar cells 162.

Furthermore, in this variation, the secondary peripheral solar panel 160 can be connected in parallel to the set of solar panels 106, 110, 114 within the system 100 such that the set of solar panels 106, 110, 114 and the secondary peripheral solar panel 160 operate at similar total output voltages (near the nominal or target output voltage of the boost converter 122) and such that the output currents of the set of solar panels 106, 110, 114 and the secondary peripheral solar panel 160 sum to a greater total output current.

8. Power Control System

Figure 4:
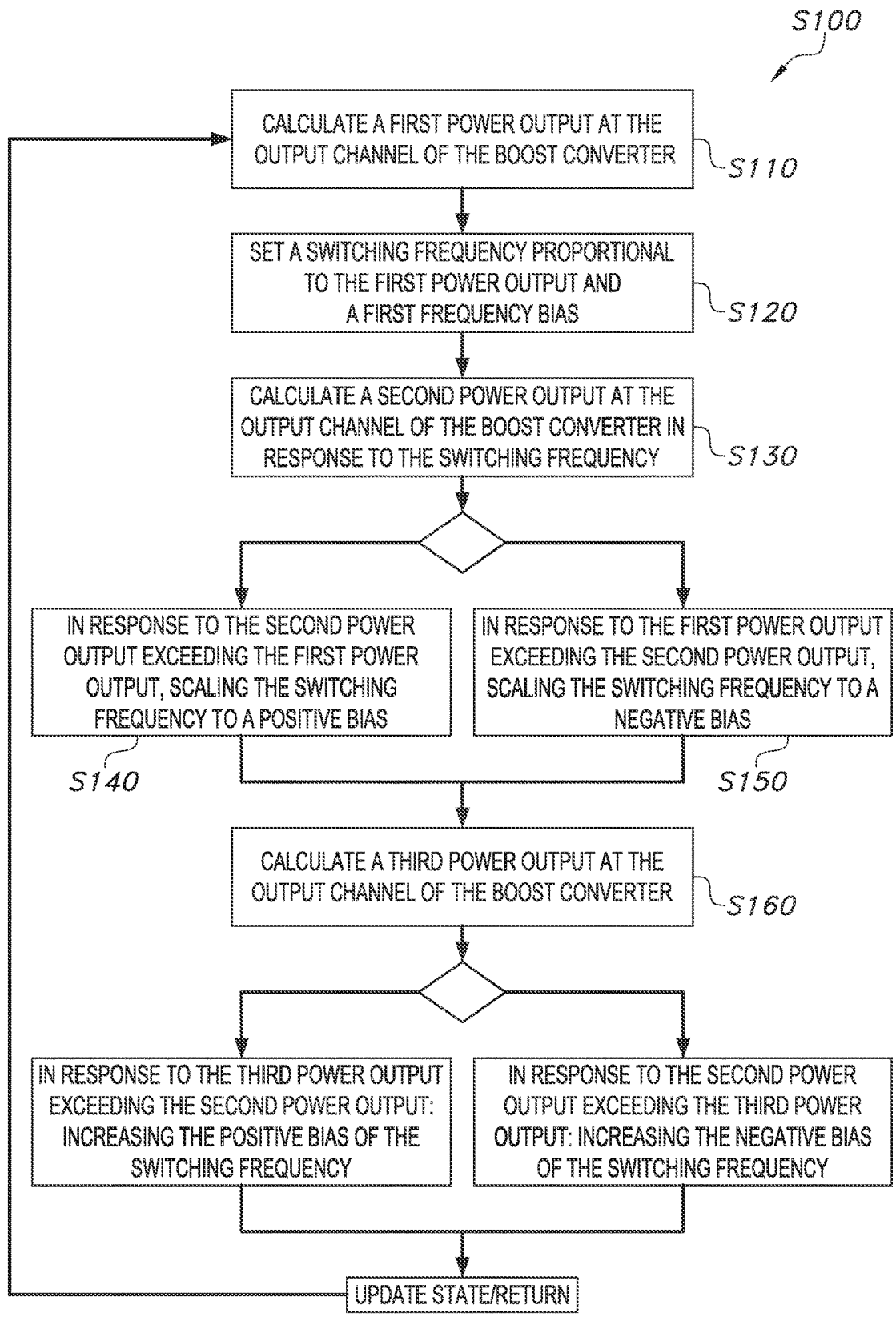
FIG. 4 is a flow diagram of an example implementation of a method.

As shown in FIGS. 2 and 4, a power control system 210 can monitor and substantially concurrently control a switching frequency of the set of switches 150 as well as a gain signal out of the boost converter 122 to the device 150. The power control system 210 can include a charge pump 124 including: a first flying capacitor 126 connectable to a first solar panel 106 arranged in a first plane and a third solar panel 114 arranged in a third plane substantially orthogonal to the first plane; and a second flying capacitor 128 connectable to a second solar panel 110 arranged in a second plane non-orthogonal to the first plane and the third solar panel 114. The power control system 210 can also include a boost converter 122 including an input channel and an output channel that is connectable to the charge pump 124 at the input channel and a device 150 at the output channel; and configured to control a gain signal. The power control system 210 can also include a controller 200 configured to: selectively switch connectivity between the first solar panel 106 and the first flying capacitor 126 and the second solar panel no and the second flying capacitor 128 to route current output by the charge pump 124 to the input channel of the boost converter 122; and selectively adjust a gain signal at the boost converter 122 on the output channel of the boost converter 122 to the device 150.

As shown in FIG. 2, the power control system 210 can also include a set of switches 150 arranged between the solar panels 106, 110, 114. In this variation of the example implementation, the controller 200 can be further configured to substantially concurrently: selectively switch connectivity between the first solar panel 106 and the first flying capacitor 126 and the second solar panel no and the second flying capacitor 128 to route current output by the charge pump 124 to the input channel of the boost converter 122; and selectively adjust a gain signal at the boost converter 122 on the output channel of the boost converter 122 to the device 150.

As shown in FIG. 4, the controller 200 of the power control system 210 can execute Blocks of the method S100 to calculate a first power output at the output channel of the boost converter in Block S110; set a switching frequency of a set of switches 150 between the first the first solar panel 106 and the first flying capacitor 126 and the second solar panel no and the second flying capacitor 128, the switching frequency proportional to the first power output and a first frequency bias in Block S120; and calculate a second power output at the output channel of the boost converter 122 in response to the switching frequency in Block S130.

The controller 200 can further execute Blocks of the method S100 by: in response to the second power output exceeding the first power output, scaling the switching frequency to a positive bias in Block S140. The positive bias applied by the controller 200 can be positive relative to the first frequency bias; and proportional to the difference between the second power output and the first power output. The controller 200 can further execute Blocks of the method S100 by: in response to the first power output exceeding the second power output, scaling the switching frequency to a negative bias in Block S150. The negative bias applied by the controller 200 can be negative relative to the first frequency bias; and proportional to the difference between the first power output and the second power output.

The controller 200 can further execute Blocks of the method S100 by calculating a third power output at the output channel of the boost converter in Block S160. In response to the third power output exceeding the second power output, the controller 200 can execute Blocks of the method S100 by increasing the positive bias of the switching frequency in Block S170. Furthermore, in response to the second power output exceeding the third power output, the controller 200 can execute Blocks of the method S100 by increasing the negative bias of the switching frequency in Block S180.

In executing Blocks of the method S100, the controller 200 can receive voltage and amperage inputs (V2 and A2) as shown in FIG. 2, with a power measurement including a product of the voltage and amperage at an output channel of the boost converter 122. The controller 200 can receive the voltage and amperage inputs continuously or substantially continuously. Alternatively, the controller 200 can sample the voltage and amperage inputs at intervals (e.g., a 10 Hz sampling interval), and in response thereto control the switching frequency of the set of switches 150 and the gain signal to the boost converter 122 at an analogous or substantially analogous control frequency. In operation, the controller 200 can execute Blocks of the method S100 to dynamically and responsively adjust both the gain signal (and therefore the gain through the boost converter 122) and the switching frequency of the set of switches 150 to ensure that the power delivered to the device 150 is the optimal and/or maximal amount of power being generated by the system 100.

9. Metrics and Monitoring

In one variation, the controller 200 constantly, intermittently, or periodically (e.g., one per minute) reads the voltage across and/or the current through each solar panel 106, 110, 114. The controller 200 can store these data in local memory and/or offload these data to a remote computer system 180, such as via a wireless transmitter (not shown) integrated into the system 100 (e.g., within a communications module of the controller 200) or by passing these data to the device 150 via a data port (not shown) for transmission to the remote computer system 180.

The remote computer system 180 (or the controller 200) can then derive metrics from these data. For example, the remote computer system 180 can calculate timeseries illumination intensity on each solar panel 106, 110, 114, 160 based on measured voltages across and/or currents through these solar panels 106, 110, 115, 160 over time. If the variance in illumination intensity between the first solar panel 106 and the second solar panel 110 is high, the remote computer system 180 can generate and transmit a message including a recommendation to a user affiliated with the system 100 to replace the system 100 with a second "hybrid" system containing first and second solar panels 106, 110 arranged in parallel, as described above.

Moreover, if the total illumination intensity across the solar panels in the system 100 is low, the remote computer system 180 can generate and transmit a message including a prompt to the user to move the system 100 and device 150 to a less-shaded location and/or connect a secondary peripheral solar panel 160 to the system 100, as described above.

Furthermore, if the daily peak illumination intensity on the first solar panel 106 remains significantly greater than the daily peak illumination intensity on the second solar panel 110, the remote computer system 180 can generate and transmit message including a prompt to the user to rotate the system 100 horizontally to achieve more consistent illumination and greater energy capture. Also, if the daily average or peak illumination intensities on the solar panels 106, 110, 114 decreases over time and this decrease are poorly correlated with seasonal solar intensity changes in the location of the system 100, the remote computer system 180 can generate and transmit a message including a prompt to the user to clean the solar panels.

However, the system 100 and/or the remote computer system can derive any other metrics and generate any other messages, suggestions, or prompts based on performance of the solar panels 106, 110, 114 over time.

10. Variations

In other variations of the system 100 described herein, various circuits and associated electronic components can be designed, manufactured, and packaged in an integrated circuit configuration. For example, the controller 200 can be integrated into the power electronics 120 components of the system 100, and the power electronics 120 components of the system 100 can also be integrated into a singular, modular, and integrated assembly for ease of manufacture, distribution, and replacement.

In other variations of the system 100 described herein, each of the solar panels 106, 110, 114 can be connected to ground via a set of input capacitors 130. Moreover, the system 100 can include a set of bypass diodes 140 arranged across all permutations of the set of solar panels 106, 110, 114 (e.g., for a set of three solar panels, there are five bypass diode connections; $N_{bypass}=(2 \times N_{panels})-1$). In use, the set of bypass diodes 140 can function to assist the system 100 in initializing and/or producing power during early morning and/or late evening hours, for example when there is insufficient illumination to begin producing power at a nominal level for the power electronics 120 and/or controller 200 to begin switching and/or boosting power from the solar panels 106, 110, 114. Therefore, if only one solar panel is illuminated, rather than dump power into non-producing solar panels, the bypass diodes will direct the produced current around the non-producing solar panels and towards the power electronics 120 for conditioning and/or boosting.

In other variations of the system 100 described herein, one or more of the various circuits and electronic components can be designed, manufactured, and packed into the device 150. For example, in this variation of the example implementation, the system 100 can include the housing 102, the solar panels 106, 110, 114, and a set of ports or couplings connecting the current and voltage outputs of the set of solar panels 106, 110, 114 directly to the device 150, which can include a set of couplings or ports directly receiving the current and voltage outputs of the set of solar panels 106, 110, 114. In this example variation, the device 150 can include integrated power electronics 120 (e.g., charge pump 124 and boost converter 122) and an integrated controller 200 to receive the direct current and voltage inputs from the set of solar panels 106, 110, 114 and condition the voltage and current for charging the battery 130 as described herein.

The system 100 and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A solar system for charging a device comprising:
   a housing comprising:
     a receptacle configured to receive a device; and
     a set of module faces arranged in a mutually-angularly-offset orientation;
   a first solar panel comprising a first set of solar cells and arranged on a first module face in the set of module faces;
   a second solar panel comprising a second set of solar cells, arranged on a second module face in the set of module faces, and connected in series to the first solar panel;
   a third solar panel comprising a third set of solar cells, arranged on a third module face in the set of module faces, and connected in series to the first solar panel and the second solar panel;
   a charge pump comprising:
     a first flying capacitor connected between the first solar panel and the third solar panel;
     a second flying capacitor connected between the second solar panel and the third solar panel; and
   a boost converter comprising:
     an input channel connected to the charge pump; and
     an output channel connectable to the device.

2. The system of claim 1, further comprising a controller configured to:
   selectively switch connectivity between the first solar panel and the first flying capacitor to route current output by the first solar panel to the input channel of the boost converter; and
   selectively switch connectivity between the second solar panel and the second flying capacitor to route current output by the second solar panel to the input channel of the boost converter.

3. The system of claim 2, wherein the controller is configured to:
   monitor a voltage across the first solar panel, the second solar panel, and the third solar panel; or
   measure a current across the first solar panel, the second solar panel, and the third solar panel;
   calculate a timeseries illumination intensity based on the voltage or the current across the first solar panel, the second solar panel, and the third solar panel;
   generate a configuration recommendation to modify a configuration of the system based on the timeseries illumination intensity; and
   transmit the configuration recommendation to a user device associated with the system.

4. The system of claim 1, wherein:
   the device comprises a doorbell;
   the housing defines a truncated rectangular pyramid;
   the first solar panel is arranged adjacent a first window defined within a first surface of the truncated rectangular pyramid;
   the second solar panel is arranged adjacent a second window defined within a second surface of the truncated rectangular pyramid opposite the first surface of the truncated rectangular pyramid; and
   the third solar panel is arranged adjacent a third window defined within a third surface of the truncated rectangular pyramid sharing a first edge with the first surface and a second edge with the second surface.

5. The system of claim 1, further comprising a battery connected to:
   the boost converter and receiving electrical current from the boost converter; and
   the device and transmitting stored electrical current to the device.

6. The system of claim 1, further comprising a port to connect the charge pump and the boost converter to a peripheral solar system comprising a set of peripheral solar panels.

7. The system of claim 6, wherein the peripheral solar system comprises:
   a set of peripheral solar panels connected in series and arranged on mutually-angularly-offset surfaces; and
   a peripheral charge pump comprising a set of flying capacitors connected in series to the set of set of peripheral solar panels.

8. The system of claim 6, further comprising a battery connected to:
   the boost converter and receiving electrical current from the boost converter; and the device and transmitting stored electrical current to the device.

9. A smart doorbell system comprising:
a truncated rectangular pyramid housing comprising:
   a receptacle configured to receive a smart doorbell; and
   a set of module faces comprising:
      a first window defined within a first surface of the truncated rectangular pyramid;
      a second window defined within a second surface of the truncated rectangular pyramid opposite the first surface of the truncated rectangular pyramid; and
      a third window defined within a third surface of the truncated rectangular pyramid sharing a first edge with the first surface and a second edge with the second surface;
a first solar panel comprising a first set of solar cells and arranged adjacent the first window;
a second solar panel comprising a second set of solar cells, arranged adjacent the second window, and connected to the first solar panel;
a third solar panel comprising a third set of solar cells, arranged adjacent the third window, and connected to the first solar panel and the second solar panel;
a charge pump comprising:
   a first flying capacitor connected between the first solar panel and the third solar panel; and
   a second flying capacitor connected between the second solar panel and the third solar panel; and
a boost converter comprising:
   an input channel connected to the charge pump; and
   an output channel connectable to the smart doorbell; and
a controller configured to:
   selectively switch connectivity between the first solar panel and the first flying capacitor to route current output by the first solar panel to the input channel of the boost converter; and
   selectively switch connectivity between the second solar panel and the second flying capacitor to route current output by the second solar panel to the input channel of the boost converter.

10. The system of claim 9, wherein the controller is configured to:
   monitor a voltage across the first solar panel, the second solar panel, and the third solar panel; or
   measure a current across the first solar panel, the second solar panel, and the third solar panel;
   calculate a timeseries illumination intensity based on the voltage or the current across the first solar panel, the second solar panel, and the third solar panel;
   generate a configuration recommendation to modify a configuration of the system based on the timeseries illumination intensity; and
   transmit the configuration recommendation to a user device associated with the system.

11. The system of claim 10, further comprising a battery connected to:
   the boost converter and receiving electrical current from the boost converter; and
   the smart doorbell and transmitting stored electrical current to the smart doorbell.

12. The system of claim 10, further comprising a port to connect the charge pump and the boost converter to a peripheral solar system comprising a set of peripheral solar panels.

13. The system of claim 12, wherein the peripheral solar system comprises:
   a set of peripheral solar panels connected in series and arranged on mutually-angularly-offset surfaces; and
   a peripheral charge pump comprising a set of flying capacitors connected in series to the set of set of peripheral solar panels.

14. The system of claim 12, further comprising a battery connected to:
   the boost converter and receiving electrical current from the boost converter; and
   the smart doorbell and transmitting stored electrical current to the smart doorbell.

* * * * *